United States Patent
Bandettini et al.

[19]

[11] Patent Number: 5,959,762
[45] Date of Patent: Sep. 28, 1999

[54] VARIABLY ADJUSTABLE CONTRAST ENHANCEMENT ELECTROCHROMIC PANEL ADAPTED FOR CURVED DISPLAY SCREENS AND METHODS OF MAKING AND USING SAME

[75] Inventors: Steven P. Bandettini, Forestville; Lindsey Brown, Healdsburg; Bryant P. Hichwa, Santa Rosa; Michael J. Cumbo, Santa Rosa; J. Gordon H. Mathew, Santa Rosa; Nada A. O'Brien, Santa Rosa, all of Calif.

[73] Assignee: Optical Coating Laboratory, Inc., Santa Rosa, Calif.

[21] Appl. No.: 08/965,000

[22] Filed: Nov. 5, 1997

Related U.S. Application Data

[63] Continuation-in-part of application No. 08/745,798, Nov. 8, 1996.

[51] Int. Cl.[6] .................................. G02F 1/15; H04N 5/72
[52] U.S. Cl. .................... 359/265; 359/275; 349/137; 348/834; 348/835; 348/842
[58] Field of Search ..................... 359/265, 275; 348/832–835, 842; 349/137; 257/437

[56] References Cited

U.S. PATENT DOCUMENTS

| | | | |
|---|---|---|---|
| 3,034,924 | 5/1962 | Kraus et al. | 427/166 |
| 3,432,225 | 3/1969 | Rock | 359/588 |
| 4,804,883 | 2/1989 | Muller et al. | 348/384 |
| 4,958,917 | 9/1990 | Hashimoto et al. | 359/275 |
| 5,091,244 | 2/1992 | Biornrd | 428/216 |
| 5,170,291 | 12/1992 | Szczyrbowski et al. | 359/580 |
| 5,216,542 | 6/1993 | Szczyrbowski et al. | 359/588 |
| 5,270,858 | 12/1993 | Dickey | 359/586 |
| 5,279,722 | 1/1994 | Szczyrbowski et al. | 204/192 |

FOREIGN PATENT DOCUMENTS

| | | |
|---|---|---|
| 0 434 656 A3 | 6/1991 | European Pat. Off. . |
| 41 17 257 A1 | 12/1992 | Germany . |
| 7-29518 | 1/1995 | Japan . |
| 7-320642 | 12/1995 | Japan . |
| 8-115687 | 5/1996 | Japan . |
| WO 93/04993 | 3/1993 | WIPO . |

OTHER PUBLICATIONS

Edlou, S. M., Simons, J.C., Al–Jumaily, G. A., Raouf, N. A., Optical and Electrical Properties of Reactively Sputtered TiN, ZrN, and HfN Thin Films, Rancourt, J. D. (ed.), Optical Thin Films IV: New Development, SPIE Proceedings, 1994; 2262: 96–106.

(List continued on next page.)

*Primary Examiner*—Georgia Epps
*Assistant Examiner*—Evelyn A. Lester
*Attorney, Agent, or Firm*—Workman, Nydegger & Seeley

[57] ABSTRACT

A flexible panel is provided that is easily and conformingly applied to a curved display screen of a VDU to afford, in a lightweight manner, variably adjustable contrast enhancement of the VDU while simultaneously providing a decrease in the amount of ambient light reflected from the curved display screen. The flexible panel is a glass microsheet layered, on one side thereof, with an antireflection coating and, on the other side, with an electrochromic device. The electrochrmic device allows for variable adjustment of the contrast of the VDU as a function of the voltage applied across the electrochromic device. The flexible glass microsheet dually possesses the advantages of conventional rigid glass panels, such as excellent optical performance, high durability, capability of being coated with various optical coatings under extreme temperature, pressure and chemical conditions and the additional benfeit of physical flexibility. This flexibility allows for easy application to variously sized and shaped curved VDU display screens. The electrochromic device is a six-layered structure deposited, in order from the layer adjacent the panel: a 1 quarter wavelength (QW) alumina layer; a first indium-tin-oxide (ITO) layer; a tungsten trioxide ($WO_3$) layer; a tantalum pentoxide ($Ta_2O_5$) layer; a nickel-oxide (NiO) layer; and a second indium-tin-oxide (ITO) layer.

21 Claims, 2 Drawing Sheets

OTHER PUBLICATIONS

Lockhart, L. and King, P., Three–Layered Reflection–Reducing Coatings, J. Opt. Soc. Am., 1947; 37:689–94.

Szczyrbowski, S.R., Szczyrbowski, K.H., Leybold, A.G., *Simple Antireflection Coatings for Cathode Ray Tube and Other Display Devices*, Hanau, West Germany, 1989.

Thetford, A., A Method of Designing Three–Layer Antireflection Coatings, Opt. Acta., 1969; 16(1): 37–43.

Saito, T., Kanna, K., Inoue, T., Morikawa, S., 5.2: Application of Engineering Film and Adhesive for Trinitron Tube, SID 95 Digest; 28–31, (1995).

¹

VARIABLY ADJUSTABLE CONTRAST ENHANCEMENT ELECTROCHROMIC PANEL ADAPTED FOR CURVED DISPLAY SCREENS AND METHODS OF MAKING AND USING SAME

RELATED APPLICATION

This application is a continuation-in-part of U.S. application Ser. No. 08/745,798, filed Nov. 8, 1996, entitled "Coated Flexible Glass Films For Visual Display Units."

BACKGROUND OF THE INVENTION

1. The Field of the Invention

The present invention relates generally to methods and apparatus for enhancing the performance of visual display units (VDU's) and more specifically relates to a variably adjustable contrast enhancing panel in the form of an electrochromic device disposed on a flexible glass microsheet and to the methods of making and using same.

2. The Relevant Technology

Many types of visual display units (VDU's) are known. They are variously shaped and sized and are utilized in varied and diverse applications. Typical VDU's include computer monitors, televisions, video games, watches and instrument displays. Some VDU's have glass display screens, such as cathode ray tubes (CRT's), while others have plastic, such as liquid crystal displays (LCD's). The display screens are often flat but may also be either cylindrically or spherically curved. In addition, the display screens are frequently layered with an antireflection coating because the materials of the display screen reflect light which then interferes with an operator's ability to perceive the visual image displayed on the screen.

The glass display screen, in general, provides an excellent scratch resistant surface and, during the fabrication process, is tolerant of broad vacillations in temperature and pressure and withstands the harmful effects of harsh chemical usage. One problem, however, is that the glass display screen requires careful handling because it is prone to breakage. Another problem is that the glass must be laboriously and meticulously cleaned, typically by grinding, buffing and polishing, in order to remove optical blemishes. Such cleaning is normally performed before an antireflective coating can be applied, for, if not, the cleaning process usually causes catastrophic failure in the coatings.

Yet deposition of antireflection coatings post-cleaning, and post-assembly of the VDU, is also problematic because deposition processes are typically performed in vacuum chambers on relatively low-profile items such as discrete glass or plastic components, glass sheets, or continuous plastic webs and are not accommodating to assembled VDU's which are comparatively large and bulky. Although specialized handling and processing techniques have been developed to permit antireflective, or other types of coatings, to be deposited directly onto the display screen surface of assembled VDU's, the techniques remain expensive and technically difficult. For these reasons, many VDUs with glass display screens have forgone the integration of an antireflection coating as part of the display screen and adopted a panel attachment, layered with an antireflection coating, for bonding to the surface of the display screen after the VDU is assembled.

Similar to display screens for VDU's, glass substrate panel attachments advantageously provide excellent hardness and scratch resistance and can also withstand a broad range of coating deposition process conditions, i.e., temperature, pressure, and chemicals. Glass substrates disadvantageously also require careful handling to avoid breakage or damage and their surface must likewise be meticulously cleaned and polished smooth before the deposition of optical coatings. If the glass substrate is a specially manufactured curved glass panel, even further complications arise. Such complications include difficulty in applying a uniform and evenly distributed optical coating to a surface thereof. Increases in care and expense in shipping and handling are also experienced because the panel is usually bulky and fragile. Moreover, since the curved glass is specially designed to fit a particular radius of curvature, the curved glass panel is commercially prevented from being adapted to other curved display screens which have a different radius of curvature.

In general, the attachment of glass panels to curved display screens is accomplished by, first, applying a layer of curable liquid adhesive directly to the display screen surface and, second, by applying the protective panel to the layer. The adhesive is then cured by exposure to ultraviolet light which passes directly through the panel. Once properly attached, the panel is effective for antireflection and protection. Although other convenient and cheaper attachment means exist, such as pressure sensitive adhesives (PSA), rigid glass panels are unable to utilize these adhesives because PSA requires a substantially unattainable degree of match in curvatures of radius between the panel and the curved display screen of the VDU.

In addition to being coated with an antireflection coating, panels are frequently coated with additional optical coatings possessing other desirable properties beyond that of antireflection. Such other properties include the elimination of static, contrast enhancement, electrical conduction and/or electrical insulation, and electromagnetic interference (EMI) shielding. With respect to contrast enhancement, it is known that certain optical coatings enhance contrast by effectively combating the visual degradation of the image on the display screen that occurs when VDU's are operated in a lighted environment. The degradation is glare and is caused by ambient light reflecting therefrom. The degradation is even more pronounced as the ambient light is more directed and brighter.

In other disciplines, electrochromic (EC) coatings are known to enhance contrast and have been used in varied and diverse applications. Such applications include memory, display and light transmission elements on windows and mirrors. In general, EC devices are electrically switchable optical devices arranged as a "stack" of materials deposited as individual thin films on a glass substrate to variably adjust light transmittance in response to a voltage stimulus applied across the stack. The voltage typically being about +/−1Vd.c. In use, the applied voltage creates an electric field across the stack of materials which correspondingly causes a reduction in the optical transmittance of light through the device or, in other words, causes absorption of the ambient light. When the voltage is reversed, the EC device is caused to return to its original state.

In view of the above, it will be appreciated that, although glass panel attachments possess both advantages and disadvantages, they are not entirely satisfactory. As such, it would be an advance to provide methods and apparatus for cost effectively enhancing the attachment of glass protective panels to curved display screens, for enhancing performance of VDUs by minimizing optical defects during attachment and by utilizing known coating deposition techniques, such as EC coatings, to allow variable adjustment of the contrast of a VDU.

SUMMARY AND OBJECTS OF THE INVENTION

It is, therefore, an object of the present invention to provide methods and apparatus for enhancing the performance of VDU's.

It is another object of the present invention to provide a variably adjustable contrast enhancing electrochromic panel having high durability, scratch resistance and hardness.

It is a further object of the present invention to provide a variably adjustable contrast enhancing electrochromic panel of sufficient flexibility to conform to variously sized and shaped curved display screens.

Yet another object of the present invention is to provide a variably adjustable contrast enhancing electrochromic panel capable of providing excellent antireflectance.

Still another object of the present invention is to provide a variably adjustable contrast enhancing electrochromic panel being easily capable of uniform bonding to a curved display screen while having minimal occurrences of optical defects.

In accordance with the invention as embodied and broadly described herein, the foregoing and other objectives are achieved by providing a variably adjustable contrast enhancing electrochromic panel that is easily applied to a curved display screen of a VDU. The contrast enhancing panel also affords protection to the display screen and decreases the amount of ambient light reflected from the display screen. The contrast enhancing panel is a flexible glass microsheet layered, on one side thereof, with an antireflection coating and, on the other side, with an electrochromic device. The flexible glass microsheet dually possesses the advantages afforded by conventional rigid glass panels, such as excellent optical performance, high durability, capability of being coated with various optical coatings under extreme temperature, pressure and chemical conditions and the additional benefit of physical flexibility. The flexibility advantageously allows for easy application to variously sized and shaped curved VDU display screens.

In a preferred embodiment the electrochromic device is a six-layered structure deposited by means well known in the art onto the flexible glass microsheet. The six layers are, in order from the layer adjacent the microsheet: a 1 quarter wavelength (QW) alumina layer; a first indium-tin-oxide (ITO) layer; a tungsten trioxide ($WO_3$) layer; a tantalum pentoxide ($Ta_2O_5$) layer; a nickel-oxide (NiO) layer; and a second indium-tin-oxide (ITO) layer. The preferred antireflection coating is, in order from the bottom layer, adjacent the incident air medium, to the top layer, adjacent the flexible glass substrate: a magnesium fluoride ($MgF_2$) layer; a mixed metal oxides layer; a third indium tin oxide (ITO) layer; a second mixed metal oxides layer; a second $MgF_2$ layer; and a third mixed metal oxides layer. The mixed metal oxides layers comprise titanium and praseodymium oxides.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
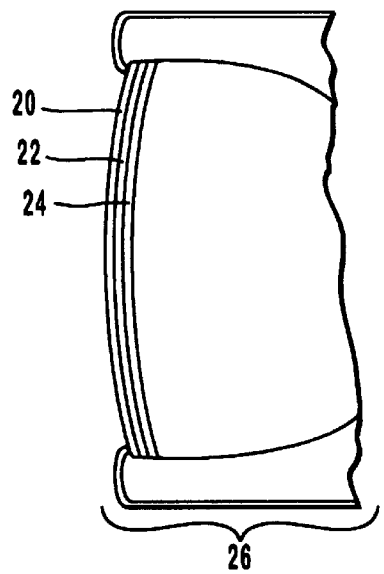
FIG. 1 is a side view of an exemplary VDU having a variably adjustable contrast enhancing panel bonded to a curved display screen in accordance with the present invention.

The present invention is directed towards methods and apparatus for enhancing the performance of VDU's. In general, a thin and flexible panel is provided that easily conforms to a curved display screen of a VDU to afford, in a lightweight manner, variably adjustable contrast enhancement while simultaneously providing a decrease in the amount of ambient light reflected from the display screen. In a preferred embodiment, the panel is a flexible glass microsheet layered, on one side thereof, with an antireflection coating and, on the opposite side, with an electrochromic device. With reference to FIG. 1, a panel 20, in the form of a flexible glass microsheet substrate, is bonded with an adhesive layer 22 to a curved display screen 24 on an exemplary VDU 26 in general accord with the teachings of the present invention.

The glass microsheet, it has been surprisingly discovered, dually possesses the advantages of conventional rigid glass panels, such as excellent optical performance, high durability, capability of being coated with various optical coatings under extreme temperature, pressure and chemical conditions and has the additional benefit of physical flexibility. The flexibility affords easy application to variously sized and shaped curved VDU display screens. A particular glass microsheet found useful in the practice of the present invention is manufactured by Corning, Inc. of Corning, N.Y. as a ribbon drawn from a glass melt. The glass ribbon is annealed and carefully cooled to insure a stress-free material having a practically flawless, firepolished surface. Glass microsheets are exceptionally thin and uniform. Available thickness ranges from a minimum of 0.0020 inch up to a maximum of 0.025 inch, i.e., 2 to 25 mils (Product Information, Corning Inc., Corning, N.Y. 14831). Glass microsheets are flat with minimal bow or wave to cause optical distortion or reflection. Unlike other types of glass such as float, molded, and polished glass, glass microsheets are not touched by other materials during manufacture and, thus, are free of foreign contamination. Because of the extremely smooth and blemish-free surface, the pre-coat cleaning process, preliminary to coating deposition, is much simpler and more easily accomplished than with other types of glass which require vigorous scrubbing with gentle detergent and gentle abrasive compounds to remove stains and foreign contamination. Glass microsheets, if carefully handled, packaged, and shipped, require only minimal cleaning to remove particulates.

In addition to the above described advantages, it has been unexpectedly discovered that the flexible glass microsheet panels having a thickness in the range of about 5 to about 14 mils, and preferably of about 10 mils, are sufficiently flexible to be conformed to variously sized and shaped cylindrically curved display screens while retaining sufficient strength to remain intact during the process of being bonded to a display screen surface. It will be appreciated that other glass microsheet thicknesses may be suitable for other applications. Surprisingly, the flexible glass microsheet panels are easier to uniformly bond to a curved display screen surface than are rigid glass curved panels. In use, the flexible glass microsheets demonstrate a much lower occurrence of optical defects during the bonding process and are readily applied with both curable and pressure sensitive adhesives. It is a feature of the present invention to utilize the described flexible glass microsheet in combination with an electrochromic optical coating for enhancing the contrast of the VDU. Inasmuch as electrochromic devices are notoriously fragile, it will be appreciated by those of ordinary skill that it is a surprising discovery that an electrochromic device can remain functional even though the flexible glass microsheet is conformingly affixed to a curved display screen.

Figure 2:
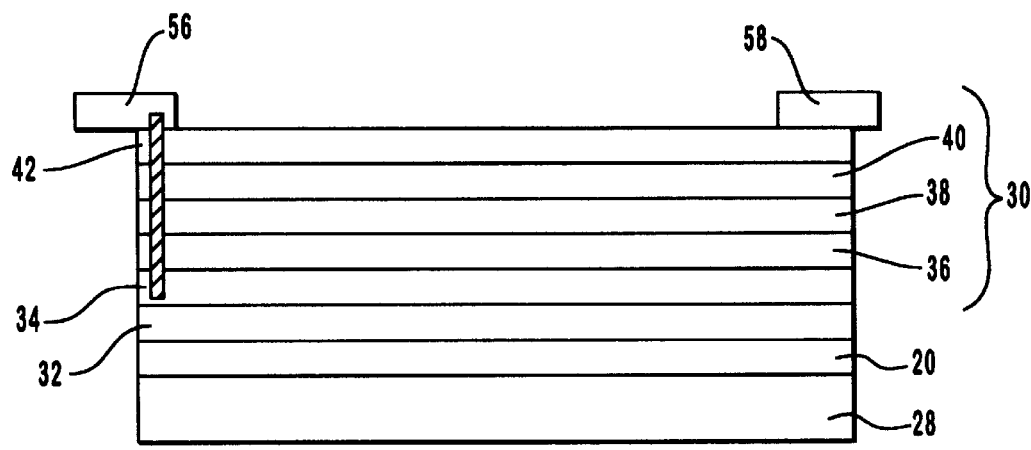
FIG. 2 is a cross section view of an electrochromic device deposited on a flexible glass microsheet having an antireflection optical coating.

With reference to FIG. 2, the panel 20, in the form of the flexible glass microsheet, is layered, on one side thereof, with an antireflection coating 28 and, on the other side, with an electrochromic device, generally depicted as 30. The electrochromic device 30 is preferably a six-layered structure comprised of the following layers deposited in order from the bottom layer, adjacent a first surface of the panel, to the top layer: a 1 quarter wavelength (QW) alumina layer 32; a first indium-tin-oxide (ITO) layer 34 having a thickness of about 3000 Å; a tungsten trioxide ($WO_3$) layer 36 having a thickness of about 4500 Å; a tantalum pentoxide ($Ta_2O_5$) layer 38 having a thickness of about 2000 Å; a nickel-oxide (NiO) layer 40 having a thickness of about 20000 Å; and a second indium-tin-oxide (ITO) layer 42 having a thickness of about 3000 Å.

It should be appreciated that the 1 QW alumina layer 32 refers to a physical or metric thickness of material which, when multiplied with the refractive index of the material, corresponds to one fourth the visible wavelength. For alumina, having a refractive index of 1.65, the physical or metric thickness corresponding to 1 QW at 500 nanometers wavelength is 500/(4×1.65)=75.76 nanometers or about 758 Å. It should also be appreciated that alumina refers to oxides of aluminum.

The deposition of the layers of the electrochromic device 30 upon the flexible glass microsheet substrate are by means well known in the art and preferably include the following techniques: reactive evaporation of aluminum oxide for the alumina layer 32; ion-assisted reactive evaporation of mixed indium tin metal for the first ITO layer 34; reactive evaporation of tungsten trioxide pellets for the $WO_3$ layer 36; reactive evaporation of tantulum metal for the $Ta_2O_5$ layer 38; reactive evaporation of nickel metal for the NiO layer 40; and, again, ion-assisted reactive evaporation of mixed indium tin metal for the second ITO layer 42. While the foregoing deposition methods are preferred, it will be appreciated in view of the teachings herein that other equally effective methods may be employed, such as chemical or physical vapor deposition, sputtering, sintering, spreading or other similar techniques.

It should be appreciated that the layers of the electrochromic device herein described are also referred to by generic terminology established by convention. For example, the first and second ITO layers 34 and 42, are the electrical conductive layers that provide means for an electrical stimulus to be applied. The intermediate layers sandwiched between the electrical conducting layers are, respective with the tungsten trioxide layer 36, the tantalum pentoxide layer 38 and the nickel-oxide layer 40, an electrochromic layer, an ion conducting layer and an ion storage layer (collectively, and hereinafter, referred to as an electrochromic stack). In general, layers 36 and 40 of the electrochromic stack are interchangeable and are selected from the group consisting of an electrochromic layer and an ion storage layer. It is also feasible that the ion storage layer and the electrochromic layer can be replaced by two electrochromic layers, one of which colors upon reduction and one of which colors upon oxidation. In the configuration depicted, however, the two layers 36, 40 both clear or color simultaneously in response to an appropriate voltage. U.S. Pat. No. 5,080,471, issued to Cogan et al., herein incorporated by reference, discloses the use of two electrochromic layers in an electrochromic device.

In addition to the preferred materials described, several other types of electrochromic materials are known, including metal oxides and electrically conductive polymers. Exemplary of the metal oxides are niobium oxide $Nb_2O_5$; nickel oxide NiO; iridium oxide $IrO_2$; vanadium pentoxide $V_2O_5$; rhodium oxide $Rh_2O_3$; and molybdenum trioxide $MoO_3$. Conductive polymers include polyaniline, polyacetylene, polypyrrole, polythiophene, polyphenylene, polyphenylene vinylene, polyphenylene sulfide, polypheryl diamene, poly ($N,N^1$ dipherylbenzidine) and derivatives, copolymers and bilayers.

Suitable solid state ion conductor materials, other than $Ta_2O_5$, include other tantala layers, i.e., tantalum oxides, $ZrO_2$, $MgF_2$, $LiNbO_3$ and suitable polymer ion conductor materials include proton conducting polymers such as polyAMPS (2-acrylamido-2-methylpropanesulfonic acid) and $Li^+$ conducting polymer such as PMMA (poly methyl methacrylate) inferences doped with $LiClO_4$.

Suitable ion storage materials, other than the preferred NiO, include, but are not limited to $IrO_2$ and $V_2O_5$.

Suitable electrical conducting layers, other than ITO, include, but are not limited to $SnO_2$:F, ZnO:Al, Al, Mo, Ni and Au. When the electrochromic device is transparent, the electrical conducting layer is preferably an ITO layer.

To complete the electrochromic device 30, voltage means 56 and 58 are formed electrically across the interior layers of the device, i.e., the stack comprising the tungsten trioxide layer 36, the tantalum pentoxide layer 38 and the nickel-oxide layer 40, so that an electrical stimulus can be applied across the stack to vary the transmittance of light through the electrochromic device. The voltage means can be any means of applying voltage and can typically include, but is not limited to, conductive tape, solder, photovoltaics and silver and carbon paints. In the embodiment shown, contact pad 56 is formed to provide an electrical contact through layers 36, 38 and 40 to the first conductive layer, the first ITO layer 34. Forming electrical contacts through numerous layers, as depicted, can be accomplished, by means well known in the art, by direct soldering of the pad to the individual thin film layers. It should be appreciated that the electrochromic device herein described may be of the type described in U.S. Pat. No. 4,350,414, issued to Takahashi et al. on Sep. 21, 1982, and the electrodes and the patterning of electrochromically active areas are more fully described in the co-pending application, Ser. No. 08/735,431, filed Jan. 2, 1997, now U.S. Pat. No. 5,724,175, entitled "Electrochromic Device Manufacturing Process," both of which are expressly incorporated herein by reference.

Figure 3:
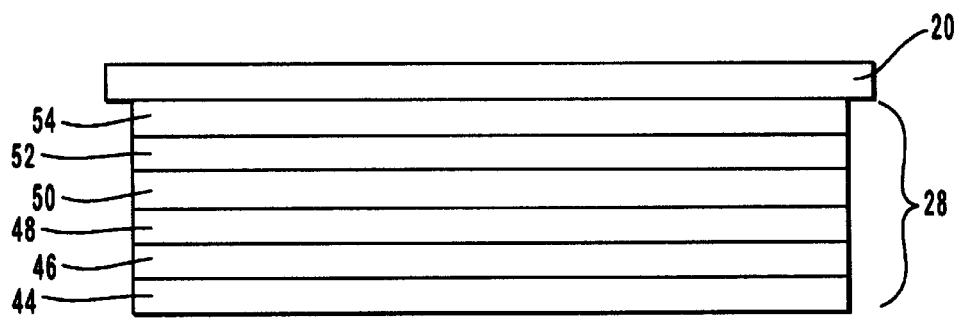
FIG. 3 is a cross section view of the antireflection optical coating of FIG. 2 according to a preferred embodiment of the present invention.

With reference to FIG. 3, the antireflection coating 28 is depicted as a six layer, electrically conductive coating applied to the flexible glass microsheet on the side opposite the electrochromic device. As depicted in order from the bottom layer, adjacent the incident air medium, to the top layer, adjacent a second surface of the flexible glass substrate: a magnesium fluoride ($MgF_2$) layer 44 having a thickness of about 97 nm; a mixed metal oxides layer 46 having a thickness of about 59 nm; a third indium tin oxide (ITO) layer 48 having a thickness of about 9.5 nm; a second mixed metal oxides layer 50 having a thickness of about 59 nm; a second $MgF_2$, layer 52 having a thickness of about 31 nm; and a third mixed metal oxides layer 54 having a thickness of about 15 nm. The mixed metal oxides layers comprise titanium and praseodymium oxides and are described in U.S. Pat. No. 3,034,924, incorporated herein by reference.

It will be appreciated that the selected antireflection coating 28 is exemplary only and not to be construed as limiting. Generally, any commercial treatment for suppressing the specular reflection of a glass surface may be used on the flexible glass microsheet. The type of antireflection coating that can be deposited upon the flexible glass microsheet substrates may be any of the known antireflective (AR) coatings for glass including single and multilayer coatings composed of nonabsorbing or slightly absorbing solid thin films prepared by standard physical or chemical deposition methods including evaporation, sputtering, chemical vapor deposition (CVD), and solvent coating. Reactive processes such as reactive evaporation and reactive sputtering and ion assisted cleaning and deposition processes may also be used. Electrically conductive AR coatings may also be used for applications requiring VDU shielding, i.e., shielding or containment of EMI generated within the VDU. Typically, these coatings contain one or more layers of a semi-transparent metal, semiconductor, or dielectric material. Common semi-transparent dielectric materials are indium oxide, tin oxide and indium-tin-oxide (ITO). The further description of applying an antireflection coating to a flexible glass microsheet is disclosed in the co-pending parent application, Ser. No. 08/745,798, filed Nov. 8, 1996, (still pending), entitled "Coated Flexible Glass Films for Visual Display Units," and is expressly incorporated herein by reference.

Figure 4:
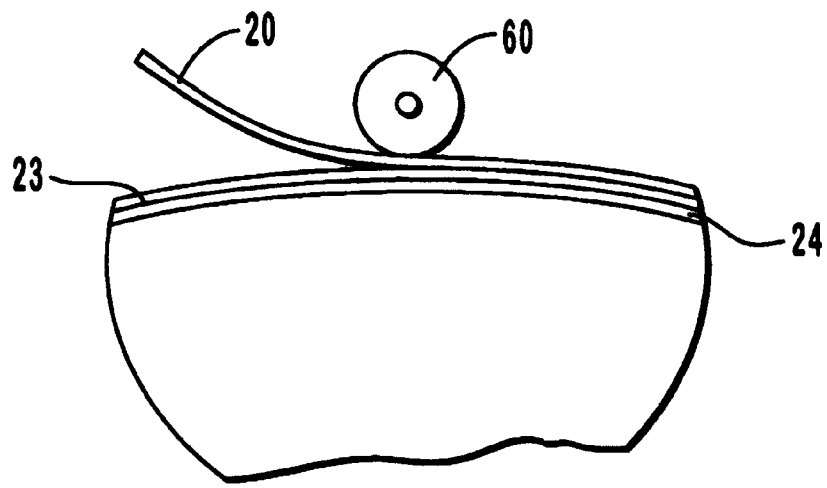
FIG. 4 is a side view of a variably adjustable contrast enhancing panel being roller applied to a curved display screen according to a preferred method of bonding.
Figure 5:
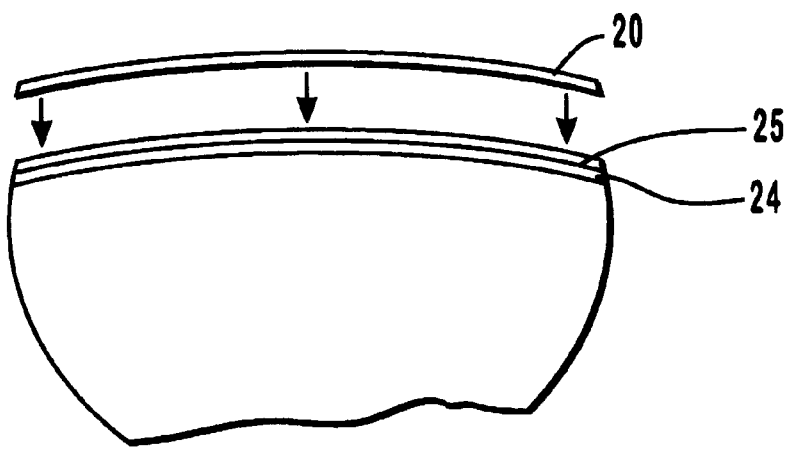
FIG. 5 is a side view of a variably adjustable contrast enhancing panel being directly applied to a curved display screen according to another preferred method of bonding.

As illustrated in FIGS. 4 and 5, cut-to-size panels 20 of flexible glass microsheets having both, on opposite sides thereof, an electrochromic and an antireflective coating were bonded to a curved glass panel simulating the front surface of the curved display screens of 17" Sony TRINITRON CRT devices. As shown in FIG. 4, one bonding method uses a pressure sensitive adhesive (PSA) such as, for example, the optically clear adhesive OCA-8142, a 2-mil thick PSA supplied with release liners on both sides (product of 3 M, St. Paul, Minn.). In operation, one liner is removed and the PSA layer 23 is applied to one of the surfaces to be bonded, i.e., either the surface of the panel 20 or, as shown in FIG. 4, the surface of the curved display screen 24. The second liner is then removed and the panel 20 and the curved display screen 24 are brought into contact with each other by a rolling process which may be effected, for example, with a nip roller 60 as shown. After the initial rolling process, regions of inadequate bonding, i.e., regions where the PSA did not completely "wet" the adjacent surface(s), may be made to contact each other with slight pressure applied, for example, with a spatula device.

The other bonding method, as shown in FIG. 5, has the panel 20 bonded to the front surface of a curved visual display screen with an ultra-violet (UV) curable adhesive such as, for example, optical adhesive NOA 68 (product of Norland Products, Inc., New Brunswick, N.J.). With the CRT in a face-up position, a predetermined amount of the UV curable adhesive is applied to the front surface of the curved display screen. The cut-to-size flexible glass microsheet is bowed to a convex-downward curve and is gently lowered to make contact with the adhesive in the center of the surface of the display screen 24. The edges of the flexible glass panel are gradually and carefully lowered until full contact is made with the adhesive layer 25 on the surface of the curved display screen. Following a period of time during which gravitational pressures equalize the adhesive thickness, the adhesive layer is cured by exposure to a strong UV light source for a suitable period of time, e.g., several minutes.

Surprisingly, both bonding processes were easily and effectively accomplished. Because wrinkles are commonly introduced during the process of bonding flexible plastic panels to display screen surfaces, it might be expected that wrinkles would also be a problem with flexible glass. Not so, because, although the flexible glass panels have sufficient flexibility to be conformed to the curvature of a cylindrically curved display screen, it appears that the inherent properties of the flexible glass panels allow for an easier bonding with the display screen surface. As a result, incidences of optical defects caused by wrinkling of the panel material are significantly lowered. Thus, it will be appreciated that the optimal thickness for the glass microsheet substrates is a balance between strength and flexibility. Above about 10 mils in thickness, the glass microsheet material is easier to handle but more difficult to conform to a curved surface without breaking. Below about 8 mils in thickness, the glass microsheet material requires more careful handling but performs excellently.

It will be appreciated that both the roll-on process illustrated in FIG. 4 or the alternative press-down process shown in FIG. 5 can be achieved with an adhesive layer of either the UV-curable or the PSA type and that other types of adhesives, e.g., epoxies, thermal-setting, and thermal- or pressure-curing adhesives could also be used with suitable conventional application methods. It should be further appreciated that no matter which adhesive type is selected, the side of the panel to which the adhesive is applied is the same side as the electrochromic device 30 so that the side of the antireflection coating 28 is positioned on the curved display screen 24 facing the observer operating the VDU. It should be apparent that such a bonding technique embeds the electrochromic device in the adhesive layer when the panel is fully attached.

Advantageously, this embodiment yields not only attenuation of the ambient light as the light passes through the panel towards the display screen but also again when the ambient light is reflected from the display screen and is passed back through the panel towards an observer. Thus, ambient light is twice absorbed and contrast is even more improved. The electrochromic device acts to reduce the intensity of undesirable reflection of light generated by the internal components of the VDU, especially the luminescent phosphor of a CRT device, by absorbing the brightness of the reflection as it passes through the panel from inside the VDU towards the observer. Yet, surprisingly, when the panel is conformed to fit onto the surface of the VDU in accordance with the method described herein, the electrochromic device, typically fragile, resists damage and exceeds performance expectations for having been curved to match the surface of the VDU. In particular, it is surprising that electrical shorts did not occur between the respective layers of the electrochromic device, nor did any regions of optical imperfection occur as might be expected with an electrochromic device having been conformingly bent into a particular shape.

Example 1

Several samples of panels 20 were prepared as flexible glass microsheets having a thickness of about 8 mils to which a six-layered electrochromic coating, as described above, was applied on one side thereof, and on the other side, an antireflective coating was applied. The samples were fitted using the described PSA techniques to curved glass panels simulating the Sony Trinitron and, after making electrical connection to the voltage means of the electrochromic device, the samples were operated in the "bleached" (zero applied voltage) and "activated" states while subjected to visual and spectrophotometric examination. The following results were observed and recorded:

| Coating Run # | Bleached | | Activated | |
| --- | --- | --- | --- | --- |
| | Transmittance (%) | Reflectance (%) | Transmittance (%) | Reflectance (%) |
| 1149-36 | 85 | 5 | 28 | 0 |
| 1149-43 | 80 | 5 | 24 | 0 |
| 1149-47 | 85 | 5 | 28 | 0 |
| 1149-48 | 80 | 5 | 28 | 0 |
| 1149-49 | 83 | 6 | 25 | 0 |
| 1149-50 | 83 | 6 | 29 | 0 |
| 1149-51 | 84 | 5 | 29 | 0 |

Example 2

Sample #348 prepared in coating run #1149-48 was observed to have the following photopic transmittance, which is defined as the visual transmittance weighted to account for sensitivities of the human eye:

| Activation Voltage (volts) | Photopic Transmittance (%) |
| --- | --- |
| 0.0 (Bleached) | 84 |
| 1.0 | 65 |
| 1.45 | 46 |
| 1.56 | 35 |
| 1.6 | 28 |

It should be pointed out that, by convention, transmittance is used to describe contrast enhancement filters and that transmittance levels range typically between 10% and 90%. In the absence of reflectance, transmittance and absorption are inversely related such that, as in sample 1149-36, when transmittance is 28% absorption is 72%. Consequently, it should be apparent from the results above that VDU contrast is variably adjustable as a function of applied voltage and enhanced by the present invention which reduces the intensity of undesirable reflection of light by both the display screen and the internal components of the VDU.

In addition to VDUs, the flexible glass microsheets, having antireflective and contrast enhancing coatings, could also be applied to other glass or plastic windows, e.g., windows for instruments such as found in automobiles and industrial applications. It will be appreciated that glass microsheet thicknesses outside of the 5–14 mil range found suitable for protective panels for bonding to VDU curved display screen surfaces might additionally be more suitable for such other applications. It will further be appreciated that other types of optical coatings may also be deposited onto one or both surfaces of the glass microsheet substrates to thereby provide the flexible glass panels with additional desirable properties.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of variably adjustably enhancing contrast of a visual display unit having a curved display screen, comprising the steps of:

obtaining a substrate, said substrate being a flexible glass microsheet having a thickness range of about 5 to about 14 mils;

depositing an electrochromic device on a surface of said substrate;

affixing said substrate to a surface of said curved display screen of said visual display unit; and variably applying a voltage stimulus across said electrochromic device to variably adjust light transmittance through said electrochromic device.

2. A method according to claim 1, wherein said step of depositing said electrochromic device on said surface of said substrate further comprises the step of:

depositing a plurality of thin film layers on said surface of said substrate, said thin film layers comprising two electrical conducting layers, an ion conducting layer and one of i) an ion storage layer and an electrochromic layer, and ii) two electrochromic layers.

3. A method according to claim 1, wherein the step of affixing said substrate to said surface of said curved display screen comprises one of the steps of:

layering a curable liquid adhesive between said substrate and said surface of said display screen; or disposing a pressure sensitive adhesive sheet between said substrate and said surface of said display screen.

4. A method according to claim 1, further comprising the step of:

coating said substrate with an antireflection coating on a surface of said substrate opposite said surface having said electrochromic device.

5. A variably adjustable contrast enhancement panel, comprising:

a flexible glass microsheet of thickness ranging from about 5 mils to about 14 mils having a first and second surface; and an electrochromic device on said first surface of said flexible glass microsheet.

6. A contrast enhancement panel according to claim 5, further comprising an antireflection coating on said second surface of said flexible glass microsheet.

7. A contrast enhancement panel according to claim 5, wherein said electrochromic device comprises:

a first layer on said flexible glass microsheet, said first layer being a first electrical conducting layer;

a second layer on said first electrical conducting layer, said second layer being selected from the group consisting of an ion storage layer and an electrochromic layer;

a third layer on said second layer, said third layer being an ion conducting layer;

a fourth layer on said ion conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer;

a fifth layer on said fourth layer, said fifth layer being a second electrical conducting layer.

8. A contrast enhancement panel according to claim 7, wherein said first layer is indium tin oxide, said second layer is tungsten trioxide, said third layer is tantalum pentoxide, said fourth layer is nickel oxide and said fifth layer is indium tin oxide.

9. A contrast enhancement panel according to claim 8, further comprising a layer of one quarter wavelength alumina between said first layer and said flexible glass microsheet.

10. A visual display unit, comprising:

a curved display screen;

a flexible glass microsheet of thickness ranging from about 5 mils to about 14 mils attached to said curved display screen; and an electrochromic device on a surface of said flexible glass microsheet.

11. A visual display unit according to claim 10, further comprising an antireflection coating on said flexible glass microsheet on a surface opposite said surface having said electrochromic device.

12. A visual display unit according to claim 10, wherein said electrochromic device comprises:

two electrical conducting layers;

an ion conducting layer; and one of i) an ion storage layer and an electrochromic layer; and ii) two eleetrochromic layers.

13. A visual display unit according to claim 12, further comprising a voltage means connected electrically across said ion conducting layer and said one of i) said ion storage layer and said electrochromic layer, and ii) said two electrochromic layers.

14. A visual display unit according to claim 10, further comprising one of a pressure sensitive adhesive and a liquid curable adhesive for attaching said flexible glass microsheet to said display screen.

15. A variably adjustable contrast enhancement panel, comprising:

a flexible glass microsheet having a thickness from about 5 mils to about 14 mils;

an electrochromic device on said flexible glass microsheet, said electrochromic device having two transparent electrodes; and an electrochromic stack.

16. A contrast enhancement panel according to claim 15, further comprising a voltage means disposed electrically across said electrochromic stack.

17. A contrast enhancement panel according to claim 15, wherein said electrochromic stack comprises:

an insulation layer;

a reducible film layer; and an oxidizable film layer.

18. A method of preparing a variably adjustable contrast enhancement panel, comprising the steps of:

obtaining a substrate, said substrate being a flexible glass microsheet having a thickness range of about 5 to about 14 mils; and depositing an electrochromic device on a surface of said substrate.

19. A method according to claim 18, further comprising the step of:

depositing an antireflection coating on said substrate on a surface opposite said surface having said electrochromic device.

20. A method according to claim 18, wherein said step of depositing said electrochromic device on said surface of said substrate, further comprises the steps of:

forming a first layer of said electrochromic device on said surface of said substrate, said first layer being a first electrical conducting layer;

forming a second layer on said first electrical conducting layer, said second layer selected from the group consisting of an ion storage layer and an electrochromic layer;

forming a third layer on said second layer, said third layer being an ion conducting layer;

forming a fourth layer on said ion conducting layer, said fourth layer being selected from the group consisting of an ion storage layer and an electrochromic layer; wherein said fourth layer is an ion storage layer or an electrochromic layer when the second layer is an electrochromic layer, and wherein said fourth layer is an electrochromic layer when the second layer is an ion storage layer; and forming a fifth layer on said fourth layer, said fifth layer being a second electrical conducting layer.

21. A method according to claim 18, wherein said step of depositing said electrochromic device on said substrate further comprises the step of:

depositing a plurality of thin film layers on said surface of said substrate, said thin film layers comprising two electrical conducting layers, an ion conducting layer and one of i) an ion storage layer and an electrochromic layer, and ii) two electrochromic layers.

* * * * *